(12) United States Patent
Gorman et al.

(10) Patent No.: US 8,214,366 B2
(45) Date of Patent: Jul. 3, 2012

(54) SYSTEMS AND METHODS FOR GENERATING A LANGUAGE DATABASE THAT CAN BE USED FOR NATURAL LANGUAGE COMMUNICATION WITH A COMPUTER

(75) Inventors: John G. Gorman, Del Mar, CA (US); John W. R. Gorman, Auckland (NZ)

(73) Assignee: Glace Holding LLC, Del Mar, CA (US)

( * ) Notice: Subject to any disclaimer, the term of this patent is extended or adjusted under 35 U.S.C. 154(b) by 278 days.

(21) Appl. No.: 12/620,513

(22) Filed: Nov. 17, 2009

(65) Prior Publication Data

US 2011/0119282 A1     May 19, 2011

(51) Int. Cl.
*G06F 17/30*     (2006.01)
(52) U.S. Cl. .......................................... 707/738
(58) Field of Classification Search .............. 707/3, 713, 707/738; 715/264
See application file for complete search history.

(56) References Cited

U.S. PATENT DOCUMENTS

| | | | |
|---|---|---|---|
| 5,819,303 A * | 10/1998 | Calhoun ........................ | 715/264 |
| 6,411,950 B1 * | 6/2002 | Moricz et al. ................... | 1/1 |
| 7,085,708 B2 | 8/2006 | Manson | |
| 7,809,714 B1 * | 10/2010 | Smith .......................... | 707/713 |
| 2001/0032199 A1 * | 10/2001 | Delo ............................ | 707/3 |
| 2006/0041424 A1 | 2/2006 | Todhunter et al. | |
| 2007/0106499 A1 | 5/2007 | Dahlgren et al. | |
| 2007/0132631 A1 * | 6/2007 | Henson et al. ................ | 342/25 R |
| 2007/0203693 A1 | 8/2007 | Estes | |
| 2008/0021924 A1 | 1/2008 | Hall et al. | |
| 2008/0040099 A1 * | 2/2008 | Wu et al. ...................... | 704/9 |
| 2009/0112835 A1 | 4/2009 | Elder | |
| 2009/0276396 A1 | 11/2009 | Gorman et al. | |

OTHER PUBLICATIONS

Y. Wilks, "Is There Progress on Talking Sensibly to Machines?" Science, 318: 927-928 (2007).
International Search Report and Written Opinion for PCT/US09/42388 mailed Nov. 30, 2009.
International Search Report and Written Opinion for PCT/US10/057099 mailed Aug. 2, 2011 (9 pages).

* cited by examiner

*Primary Examiner* — Etienne Leroux
(74) *Attorney, Agent, or Firm* — Procopio Cory Hargreaves & Savitch LLP; Noel C. Gillespie

(57) ABSTRACT

A system for knowledge representation in a computer that can enable unrestricted natural language communication with a computer, comprising a database configured to store at least one table, the table configured to store associations between concepts in a text string and associated concept identifiers; and a builder interfaced with the database, the builder configured to construct a table that represents knowledge defined by a text string, the text string comprising (n) operands and (n−1) operators, by performing a process comprising the following steps: combining concepts in the text string into first order sub-concepts according to precedence defined by the operators, combining the first order sub-concepts into higher order concepts according to the precedence defined by the operators, repeating the steps until the higher order sub-concepts join to form a concept that represents the entire text string, and storing the concept, first order sub-concepts, and higher order sub-concepts in the database.

28 Claims, 7 Drawing Sheets

| | | | | | | |
|---|---|---|---|---|---|---|
| 174 | 001.001.287 | Does | | Does | | Does |
| 175 | 001.001.288 | Batman | | Batman | | Batman |
| 176 | 001.001.289 | have | | have | | have |
| 177 | 001.001.290 | a | | a | | a |
| 178 | 001.001.291 | nemesis | | nemesis | | nemesis |
| 179 | 001.001.292 | ? | | ? | | ? |
| 182 | 001.001.293 | | a~nemesis | C+AN | | a nemesis |
| 183 | 001.001.294 | | have~AN | C+HAN | | have a nemesis |
| 184 | 001.001.295 | | Batman~HAN | C+BHAN | | Batman have a nemesis |
| 185 | 001.001.296 | | Does~BHAN | C+DBHAN | YTJ | Does Batman have a nemesis |
| 186 | 001.001.297 | | DBHAN~? | C+DBHAN? | YTJ | Does Batman have a nemesis ? |
| 187 | 001.001.298 | | | | YTJ | Yes, The Joker |
| 188 | 001.001.299 | | | | | |

FIG. 1

| ID | Type | Reference | Vocab | Lookup | Of Concept | Response | Text |
|---|---|---|---|---|---|---|---|
| 347 | | 001 002 301 | A | | A | | A |
| 348 | | 001 002 302 | B | | B | | B |
| 349 | | 001 002 303 | C | | C | | C |
| 350 | | 001 002 304 | , | | , | | , |
| 351 | | 001 002 305 | and | | and | | and |
| 352 | | 001 002 306 | or | | or | | or |
| 353 | | 001 002 307 | | A˜ | A˜ | | A, |
| 364 | | 001 002 307 | | A˜and13 | and13 | | A, B and C |
| 365 | | 001 002 307 | | A˜or13 | or113 | | A, B or C |
| 354 | | 001 002 308 | | and˜C | AC | | and C |
| 361 | | 001 002 309 | | or˜C | OC | | or C |
| 355 | | 001 002 310 | | B˜AC | and13 | | B and C |
| 363 | | 001 002 311 | | B˜OC | or13 | | B or C |
| 356 | | 001 002 312 | | and13˜BAC | and13 | | A, B and C |
| 362 | | 001 002 313 | | or13˜BAC | or13 | | A, B or C |
| 359 | | 001 002 314 | | | | | |

FIG. 4

| | | | | | |
|---|---|---|---|---|---|
| 98 | 001.002.203 | a | | a | a |
| 105 | 001.002.204 | king | | king | king |
| 109 | 001.002.205 | queen | | queen | queen |
| 112 | 001.002.206 | beautiful | | beautiful | beautiful |
| 113 | 001.002.207 | princess | | princess | princess |
| 118 | 001.002.208 | | a~king | C+ AK | a king |
| 119 | 001.002.209 | | a~queen | C+ AQ | a queen |
| 120 | 001.002.210 | | beautiful~princess | C BP | beautiful princess |
| 122 | 001.002.211 | | a~BP | C+ ABP | a beautiful princess |

FIG. 5

| | | | | |
|---|---|---|---|---|
| 25 | 002.002.000 | | | AM WAM DWAM $B A$ IA DWAMIA DWAMIA, TH CB CBC 5,000CBC A5,000CBC TH A5,000CBC BTH A5,000CBC D |
| 26 | 002.002.001 | | | |
| 1 | 002.002.050 | disney | disney | disney |
| 2 | 002.002.051 | will | will | will |
| 3 | 002.002.052 | acquire | acquire | acquire |
| 4 | 002.002.053 | marvel | marvel | marvel |
| 5 | 002.002.054 | in | in | in |
| 6 | 002.002.055 | acquire | acquire | acquire |
| 7 | 002.002.056 | $4 | $4 | $4 |
| 8 | 002.002.057 | billion | billion | billion |
| 9 | 002.002.058 | deal | deal | deal |
| 10 | 002.002.059 | | | |
| 11 | 002.002.060 | bringing | bringing | bringing |
| 12 | 002.002.061 | the | the | the |
| 13 | 002.002.062 | hulk | hulk | hulk |
| 14 | 002.002.063 | and | and | and |
| 15 | 002.002.064 | 5,000 | 5,000 | 5,000 |
| 16 | 002.002.065 | comic | comic | comic |
| 17 | 002.002.066 | book | book | book |
| 18 | 002.002.067 | characters | characters | characters |
| 19 | 002.002.068 | into | into | into |
| 20 | 002.002.069 | the | the | the |
| 21 | 002.002.070 | disney | disney | disney |
| 22 | 002.002.071 | fold | fold | fold |
| 23 | 002.002.072 | | | |
| 24 | 002.002.073 | acquire~marvel | AM | acquire marvel |
| 27 | 002.002.074 | will~AM | WAM | will acquire marvel |
| 28 | 002.002.075 | disney~WAM | DWAM | disney will acquire marvel |
| 29 | 002.002.076 | $4~billion | $B | $4 billion |
| 30 | 002.002.077 | $B~deal | $D | $4 billion deal |
| 31 | 002.002.078 | a~$D | A$ | a $4 billion deal |
| 32 | 002.002.079 | in~A$ | IA | in a $4 billion deal |
| 33 | 002.002.080 | DWAM~IA | DWAMIA | disney will acquire marvel in a $4 billion deal |
| 34 | 002.002.081 | DWAMIA~, | DWAMIA, | disney will acquire marvel in a $4 billion deal , |
| 35 | 002.002.082 | the~hulk | TH | the hulk |
| 36 | 002.002.083 | comic~book | CB | comic book |
| 37 | 002.002.084 | CB~characters | CBC | comic book characters |
| 38 | 002.002.085 | 5,000~CBC | 5,000CBC | 5,000 comic book characters |
| 39 | 002.002.086 | and~5,000CBC | A5,000CBC | and 5,000 comic book characters |
| 40 | 002.002.087 | TH~A5,000CBC | THA5,000CBC | the hulk and 5,000 comic book characters |
| 41 | 002.002.088 | bringing~THA5,000CBC | BTHA5,000CBC | bringing the hulk and 5,000 comic book characters |
| 42 | 002.002.089 | DWAMIA,~BTHA5,000CBC | DWAMIABTHA5,000CBC | disney will acquire marvel in a $4 billion deal, bringing the hulk and 5,000 comic book characters |
| 43 | 002.002.090 | disney~fold | DF | disney fold |
| 44 | 002.002.091 | the~DF | TDF | the disneyfold |
| 45 | 002.002.092 | into~TDF | ITDF | into the disneyfold |
| 46 | 002.002.093 | DWAMIABTHA5,000CBC~ITDF | DWAMIABTHA5,000CBCITDF | disney will acquire marvel in a $4 billion deal, bringing the hulk and 5,000 comic book characters into the disneyfold |
| 48 | 002.002.094 | | | |
| 49 | 002.002.095 | | | |

FIG. 7

SYSTEMS AND METHODS FOR GENERATING A LANGUAGE DATABASE THAT CAN BE USED FOR NATURAL LANGUAGE COMMUNICATION WITH A COMPUTER

BACKGROUND

1. Technical Field

The embodiments described herein are directed to natural language communication with a computer, and more particularly to methods for generating A databases that links language and punctuation with concepts that allow a computer to communicate using natural language and to take appropriate action in response to requests and directives.

2. Background

Developing a machine capable of understanding human thought and natural language has been the goal of computer science since Alan Turing first proposed the Turing Test in 1950; however, the ability to develop such a machine has remained elusive. Conventional computer programs can process text and do word search and speech to text at a high level, no current program is able to understand in any real depth the meaning incorporated in text. In co-pending U.S. patent application Ser. No. 12/429,199 (the '199 application), entitled "Systems and Methods for Natural Language Communication With a Computer," filed Apr. 23, 2009, a database medium is presented that allows such a machine to be implemented. As described in the '199 application, the implementation of such a machine is dependent on a database implementation of what can be term a fifth medium, or M5 database.

Several examples methods for developing an M5 database are discussed in the '199 application. Some of these methods will be discussed or summarized below, but to briefly recap: the systems and methods described in the '199 application views all three language elements: lexical words, grammaticals, and punctuation marks simply as symbols for concepts, as operands in an algebraic expression. Language is the choreography of thought; language comprises precise instructions for building complex concepts in the mind of a second person. Accordingly, when a sensible language expression spells out the series of binary mental operations needed to construct a complex concept, it is using the methods of algebra. But, unlike in algebraic expressions, in language expressions the operators are missing and must be reinserted by the listener. In other words, to understand written or oral communication, a listener must perform a series of binary mental operations on the concepts presented in the communication to construct a complex concept in their minds.

An M5 database comprises the equivalent of these mental operations such that a computer can parse textual input just as a human would.

SUMMARY

A system for knowledge representation that can enable unrestricted natural language communication with a computer is disclosed herein.

According to one aspect, a system for knowledge representation in a computer that can enable unrestricted natural language communication with a computer, comprises a database configured to store at least one table, the table configured to store associations between concepts in a text string and associated concept identifiers; and a builder interfaced with the database, the builder configured to construct a table that represents knowledge defined by a text string, the text string comprising (n) operands and (n−1) operators, by performing a process comprising the following steps: combining concepts in the text string into first order sub-concepts according to precedence defined by the operators, combining the first order sub-concepts into higher order concepts according to the precedence defined by the operators, repeating the steps until the higher order sub-concepts join to form a concept that represents the entire text string, and storing the concept, first order sub-concepts, and higher order sub-concepts in the database.

According to another aspect, a method for enabling unrestricted natural language communication with a computer in a system comprising a database configured to store at least one table, the table configured to store associations between concepts in a text string and associated concept identifiers and a builder interfaced with the database, the builder configured to construct a table that represents knowledge defined by a text string, the text string comprising (n) operands and (n−1) operators, the method comprising combining concepts in the text string into first order sub-concepts according to precedence defined by the operators, combining the first order sub-concepts into higher order concepts according to the precedence defined by the operators, repeating the steps until the higher order sub-concepts join to form a concept that represents the entire text string, and storing the concept, first order sub-concepts, and higher order sub-concepts in the database.

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which:

FIG. 1 is a screen shot illustrating an example of a M5 table that can be constructed in accordance with one embodiment;

FIG. 4 is a screen shot illustrating another example of a M5 table that can be constructed in accordance with one example embodiment;

FIG. 5 is a screen shot illustrating another example of a M5 table that can be constructed in accordance with one example embodiment;

FIG. 7 is a screen shot illustrating another example M5 database that can be constructed in accordance with one example embodiment.

DETAILED DESCRIPTION

Figure 2:
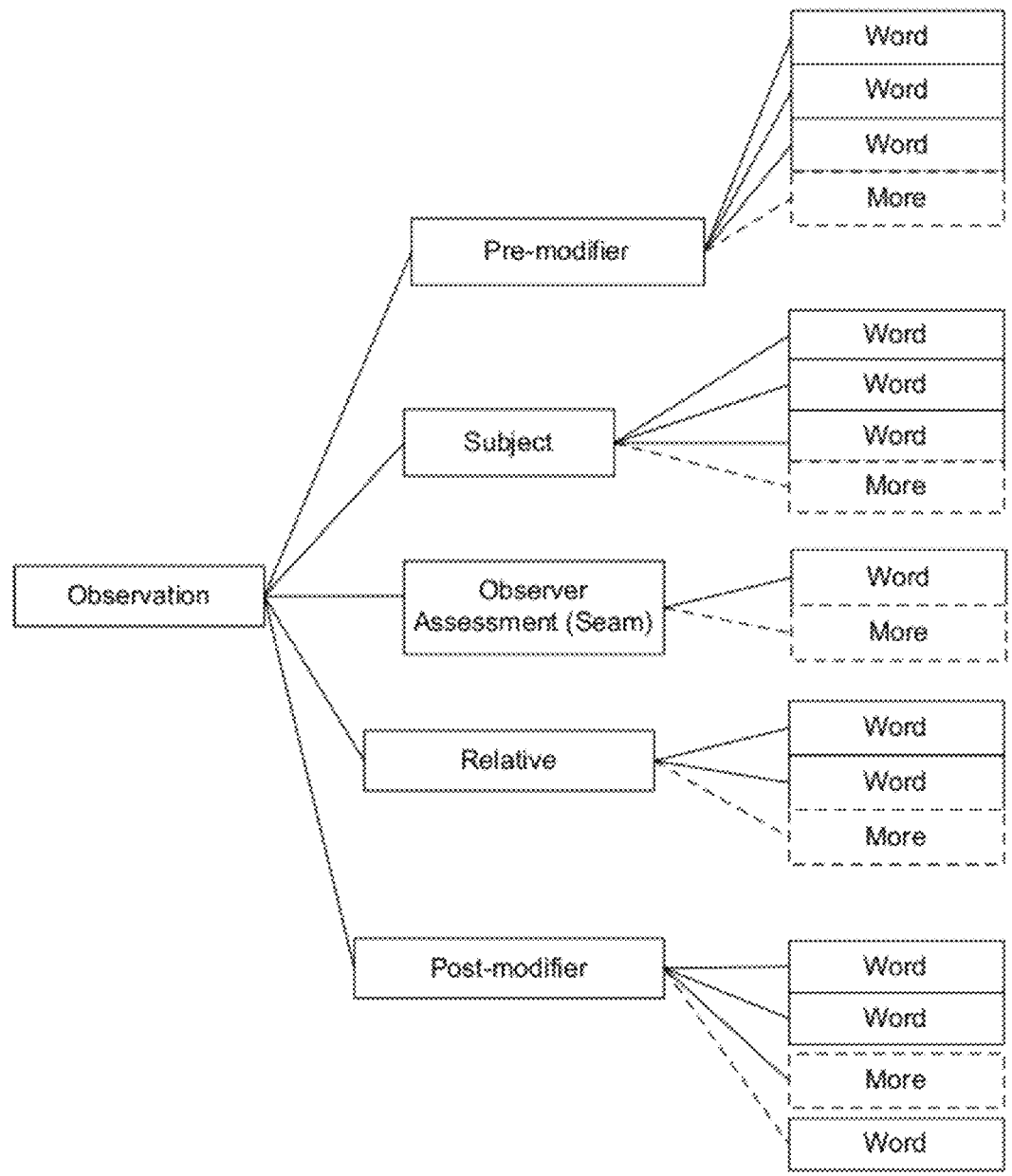
FIG. 2 is a tree diagram illustrating the structure of an observation concept that can be modeled using the table of FIG. 1.

The systems and methods described in the '199 application are able to construct the complex mental concepts encoded in language expressions but only in conjunction with a M5 database table. The M5 database is a table of equations containing symbols that represent clear mental concepts. Each row of the table defines a binary operation or equation that directs a computer program to convert two operand symbols representing mental concepts into a single symbol, representing a product mental concept. Each row contains an equation that makes a result concept equal to the product of the operation on two party concepts. This table enables a parser program to parse complex input text and determine precisely which mental concept it means.

The computer parser program described in the '199 application emulates the operations performed in the mind of a reader or listener by performing binary algebraic operations on symbol pairs represented by adjacent language elements of the text. Each computer operation combines two symbols and replaces them with a single symbol until there is only one symbol remaining, which stands for the meaning of the whole expression Access to a M5 database, or table symbolizing all of the specific mental operations encoded by a sensible language expression is required for the parser program to determine the meaning of that expression. The parser program uses a methodology similar to a calculator algorithm that uses Reverse Polish Notation (RPN) to evaluate the meaning of the text string without human supervision. This system enables a computer to parse sensible natural language inputs and obtain a single symbol that represents the meaning of the whole text The parser program parsing a particular text will find the precise database row in an M5 table that represents the complex concept encoded in that text. By tying appropriate programmed responses to that database row the computer can respond very appropriately to text inputs and so mimic a human mind to a high degree.

Thus, in order for the systems and methods described in the '199 application to operate correctly, an associated M5 database must be created. The '199 application described several example methods for generating an M5 table; however, these methods can be time consuming when generating a large database. Accordingly, automated methods for generation of an M5 database that can reduce the time and complexity of creating the database are described below. But first, the structure of an M5 database as disclosed in the '199 application will be described here.

In the '199 application, the entries in an M5 database are referred to as join rows. As explained in the '199 application, a relatively small set of join rows can precisely specify the structure of a complex mental concept by defining how its component concepts are joined to each other. Each join creates a join product idea made up of the two subcomponent ideas. Just as a text can define the structure of a complex mental concept, this set of join rows represents a complex concept and defines its precise structure. It is an alternate medium to text for holding the mental thoughts of an author. It matches the meaning of the original source text, or of unwritten thought. An M5 domain of knowledge contains many complex concepts each modeled by its own set of join rows. These sets of join rows are aggregated together into a table of join rows that models the whole domain of knowledge.

Thus, complex mental concepts specified by texts can be represented as a list or table of all legal joins between component concepts. In other words, a set of join rows describes and defines a data tree structure able to represent a complex mental concept, idea, or thought. In each join row, two concepts identified by their unique concept ID#s are indicated to join together to produce a product concept, identified by its unique concept ID#. Each such join is defined in a row in a database table. Each join row of the table can hold the ID#s of the concepts that are joined to form a compound product concept and also the ID# of the compound product concept thus formed. Each row can represent a concept as does the unique ID# of the concept. Thus these rows could be called joins or could be called concepts. Knowledge organized in this alternate fashion, in M5, has values and properties quite different from the same knowledge stored as text because a computer or processor can understand the relations between the concepts, understands the place of any concept in the knowledge base.

To implement the join table, a new row or record is created in a database table for each individual idea, simple or complex. This row contains all the necessary information to uniquely identify the idea, specify its relationships with connected ideas, and can have a text field containing the language words, paraphrases, sentences, or paragraphs that language can use to identify and describe the idea or thought that the record represents.

Two important fields are the field that contains the ID#s of the two concepts that were joined to form the product concept, and the field that contains a concept ID# of the product concept. Other fields of the record can contain metadata useful for processing the table.

In certain embodiments, all joins that exist between the simple mental concepts can be listed first in the table. Then any joins between the product concepts of the first joins and still unjoined simple concepts. Then joins between pairs of compound concepts to form complex concepts can be added to the list. Then joins between complex concepts to form more complex concepts, and so on until the final join produces a single complex concept root node that represents the structured concept and all of its component concepts in their place. It is important that no illegal joins are listed in the join row table.

The purpose of the paragraph-sentence-line/order column is that it imposes a tree structure on the whole M5 knowledge domain, allowing concepts to take their place in the domain in a logical and convenient manner. Like a language text, a domain of knowledge in M5 can be divided into numbered observation concepts and paragraph concepts, which are ordered in the manner of written text. So every join row can be marked by values in a special order field/column of the concept record as to which observation and paragraph concept that idea is party to. This proves useful when creating the database, for keeping concepts in an organized structure, and for sorting of the database table back into order or into some useful new order. It also provides a place for insertion of new concepts into the exact observation concepts and context where they apply. The order column is also important in enabling ancillary software programs to be aware of context, by searching the database for local concepts when settling on which concept, say, a personal pronoun is referring to. This is a powerful function for resolving ambiguity, allowing ancillary programs to operate at a truly human level in understanding text inputs.

For convenience in the same table, there can also be a text field/column for vocabulary words and punctuation marks, which links each such text element to its concept number. These concepts can be considered the simple unjoined atomic concepts and since they are not joined to another concept in the row the product concept is the same concept itself.

There can optionally be a row that lists concept ID#s of all the concepts that the concept of that row is a member of, necessary for the intersection method of parsing.

Accordingly, just as in the mind, a complex concept is composed of a large number of clear concepts related to each other precisely, i.e., the structures of concept ID#s are joined to concept ID#s to form more complex concept ID# constructions. Then concept ID#s of more complex concepts are joined to represent even more complex concepts. And so on recursively to finally represent a unitary complex concept construct that holds all of its component concepts in a particular structure.

Figure 3:
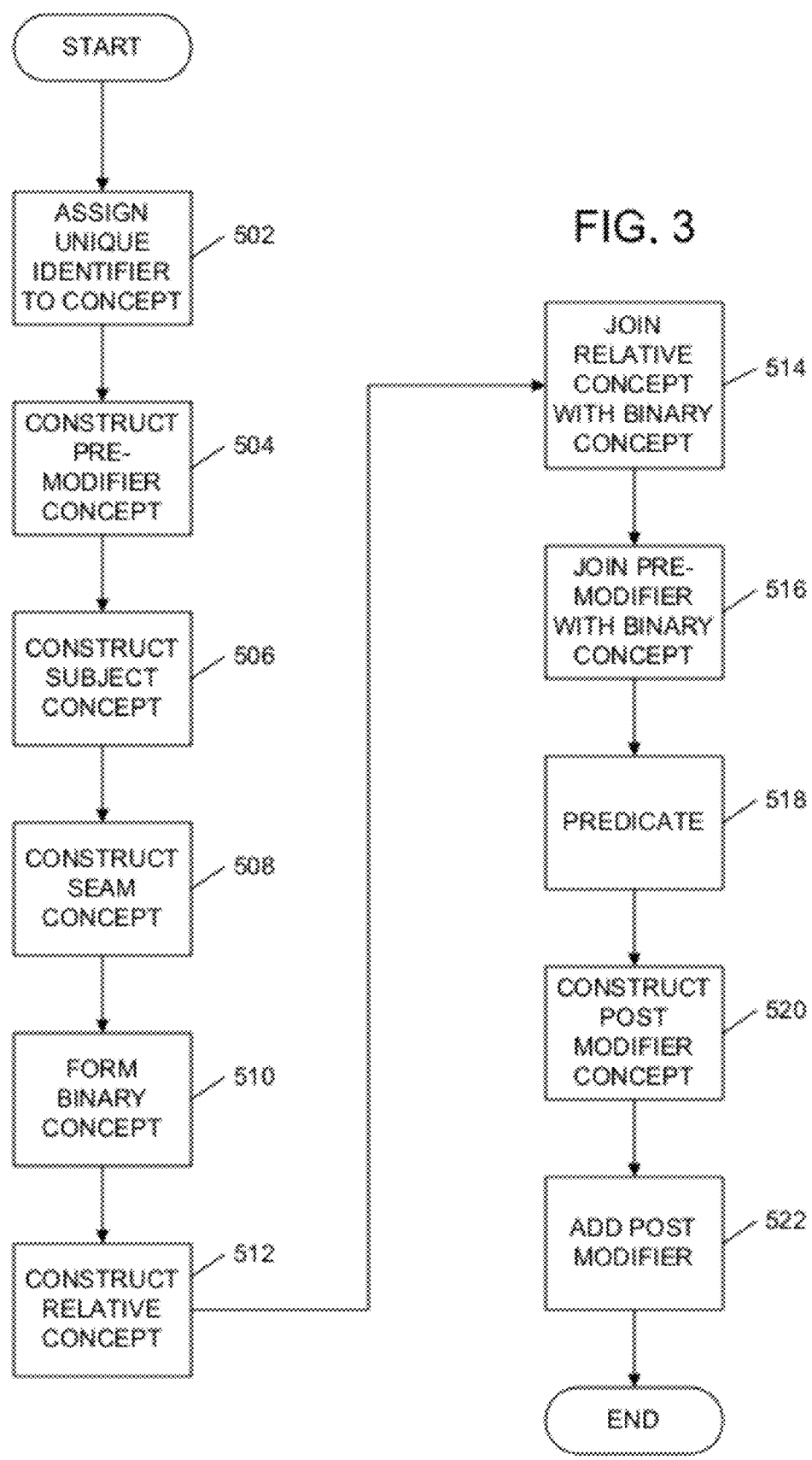
FIG. 3 is a flow chart illustrating an example method for parsing a text string using the table of FIG. 1 in accordance with one embodiment.

FIG. 3 of the '199 application, which is presented here as FIG. 1, is a screenshot illustrating an exemplary M5 database table that enables a parsing program to derive the concept ID# DBHAN? from the input string question "Does Batman have a nemesis?" Thus, the example also illustrates a method of using acronyms or initialisms to create unique concept ID#s.

The above table rows or records form a tree structure for concept DBHAN? in the following way: the "Vocab" column of each row contains each lexical word or unit, a grammatical word, or punctuation mark of the input text. In this case, these elements are in rows 174-179. The Lookup field contains the pair of concepts that join to make up the concept represented by that row with the ~ representing the join symbol. The concept field contains the concept ID# of the concept. The response field contains the concept ID# of the row in the table that represents the response concept, in effect a pointer to that row. The text field contains the text that best describes the concept of the row.

It will be seen that the set of 11 rows, 174-186, define a tree. Concept DBAN? that has edges of DBHAN and ?. ? is a leaf node of the tree. DBHAN has edges of concepts Does and BHAN. Does is a leaf concept. BHAN is adjacent to Batman and HAN. Batman is a leaf concept. HAN is made up of Have and AN. Have is a lexical leaf concept. AN points to A and Nemesis. A is a grammatical leaf and nemesis a lexical leaf. This is a directed binary graph in Graph Theory. YTJ is a response concept, which can, e.g., cause an enable computer to output the text "Yes, The Joker."

Concept DBHAN? is represented in Fifth Medium by the tree defined by the set of the 11 rows 174-186, by row 186 alone and by concept ID# DBHAN? alone. Of course, the text string "Does Batman have a nemesis?" also represents this concept, but in Fourth Medium as described in the '199 application.

As can also be seen, join-rows can have a response field containing pointers to rows that represent actions computer is capable of taking Row 187 is such a response row, pointed to from rows 185 and 186. It contains in its Text field the text "Yes, the Joker", which would be output when concept row 186 was found by parsing the input question "Does Batman have a nemesis?"

In the databases, each concept record or join row can have a unique ID# and pointers to ID#s of other conceptually related rows, which in turn have pointers to other conceptually related records, enabling a particular set of linked records to form a tree structure able to model collectively any particular human thought in all its detail. Besides its ID#, each join row can contain the ID#s of the pair of mental concepts that were joined to make it, each represented by their own row in the database, as well as the set of ID#s of the more complex concepts that this concept is or can be a component of, again each represented by their own row in the database.

Each component row of the tree represents one of the subcomponent concepts that make up the complex concept. And the pointers specify that subconcept's exact place in the complex concept structure. This related set of rows in the database can model a complex mental concept in acute detail. For each such concept tree there is a root record that can stand in for its entire tree concept, whose unique ID# identifies and names the unique mental concept that that tree of records represents. Thereby, a complex concept can be represented in the database by this tree structure, or by a single row, or by an ID#.

Since human thought models (noun) entities, (verb) states, events, and actions and the (seam) relations between them in the real present world around us or in some imaginary world, metadata fields can be added to the records to specify whether they represents something real in the present, past, or in the future or something imaginary, in the present, past, or in the future. Concept records have other fields containing specifiers of various other properties of the mental concept they represent, such as which media is host to the concept, whose mind it is being held in, or in what text corpus, whether written or audio, its concept type, and any other property useful for the computer program to make use of when processing it.

The '199 application goes on to describe various types of joins and various types of concepts that can be model in an M5 database. The description of one important concept, the observation concept, is included here.

An observation concept represents a state when the observer has time to examine a point in the real or imaginary world and then see what he sees, i.e., all of the ancillary concepts that are related there forming a recognizable sensory pattern. This is observer driven construction of a state observation concept.

An observation concept represents an event when it happens in front of an observer. The event drives construction of the observation concept in the observer's mind. The observer's attention is caught by sensory patterns, i.e., concepts, showing up. He may have a situation. He has to make sense of the pattern, via a sensing. He has to relate them to each other and to see if they can be composed into a recognizable pattern already known to him that may have meaning in a larger context. To be able to see untoward concept patterns, foresee problems, and start measures to avert them is a survival skill highly selected for in human evolution.

An observation concept represents an action when the observer/actor first imagines what he will see if he takes an action, takes the action, and realizes what he imagined. Here the observer drives the construction of the observation concept in his mind.

The core of every observation concept in the systems and methods described herein is a triad comprised of three main component concepts: a subject concept, a seam concept and a relative concept. Optionally there may be a pre-modifier concept(s), which are common, and a post-modifier concept(s), which are less common.

In an English finite sentence the word strings that name these three components are discrete, have hidden boundaries between them and appear in subject/seam/relative order as shown in FIG. 4 of the '199 application, which is recreated here as FIG. 2 and which shows the tree diagram of an observation complex. The order can be reversed for poetic effect in certain finite sentences. Finite sentences sometimes run up to 100 words yet they are still comprised of the same five standard building blocks: the triad concept: subjectseamrelative, plus one or more modifiers.

Here are some example finite sentences with strings split into these component parts:

He (subject) is (seam) a baker (relative)

Harry (subject) still has (seam) many good friends (relative)

He (subject) does (seam) bake good pastries (relative)

But (modifier) the accessible Dalai Lama, whose voice can be downloaded as a ring tone and who crisscrosses the globe with a populist message of compassion and kindness, (subject) is only (seam) a part of who he is (relative).

He (subject) is mostly, and radically, (seam) a private man (relative).

It's easy to forget, given the sensitivities that have been awakened in this country since 9/11, thrusting lifelong citizens under suspicion for having foreign-sounding names and subjecting visitors to the indignity of being fingerprinted, that (modifier) America (subject) was (seam) conceived in a spirit of openness, as a land where people could build new identities, grounded in the present and the future, not the past (relative).

In this last sentence the long pre-modifer expression is putting a very subtle spin on the main clause; however, creating the sets of M5 join rows that can define the structure of this modifier concept is straightforward. Then, once represented by single concept ID#s, it can be joined in to the whole observation concept structure.

Detecting the mostly unmarked borders that separate these strings that describe the triad can sometimes tax even a human parser; however, no matter how convoluted the sentence, no matter how many subordinate clauses decorate these concepts, it is a simple task for a parser program that has the help of a join row table.

In parsing a finite sentence it is imperative that the parser, when about to read a sentence, knows that the parser will be apprised of a triad of subject, seam, and relative in that order. First a subject concept will be disclosed and this subject will be in a specified seam relation to a relative concept to be disclosed. Then other information about the observation can be added with comma separated pre- and post-modifier phrases, which parse to single concept ID#s.

In other words, the parser will be told the subject and then immediately told what kind of relation it will be plus the observer's assessment of that relation, and then told the relative. Next, other information about the observation can be added with comma separated pre-modifier and post-modifier phrases.

The subject and relative concepts of an observation can be quite complex in their own right and have to be prebuilt and assigned a concept ID# up front, the same concept ID# that would be obtained by parsing the subject and relative text strings of the finite sentence.

Subject concepts are always entity concepts. Very long and recursive text strings are often used to describe subject concepts yet an M5 parser, with the help of an M5 join table, is able to parse the string to a single concept ID# of that expression no matter how long or convoluted the string is.

A seam concept is a specialized cluster of parameters encoded in every finite sentence that make the sentence a finite sentence. They define the relationship between the subject concept and the relative concept plus the observer's take on the "reality" of the relation. Seam concepts are specified in language by a specialized grammatical particle or a short string of specialized grammaticals, or a verb inflection, embedded in the finite sentence.

Language has several techniques for encoding seams in finite sentences, which have to be decoded by the second person: the seam concept can be included in the grammatical particles is, am, are, was, were, has, have, had, does, do, did, can, could, may, might, will, would, shall, should, must, dare, and used to. Has to can optionally be treated as one of these. These grammaticals carry the observer's reality stamp and the type of relation featured in this observation. Interestingly, there is no overlap of this group with the other elements of language except for will and can, which are also lexicals. For this reason they are excellent markers of the end of the subject phrase.

These special grammaticals carry the world parameter, which indicates whether the observer is seeing the relation between subject and relative in his real present world or in some imaginary or memory world. In English, the past is treated as a memory world. For example is and can indicate present real world, was and could memory world.

An affirmation/negation parameter: affirmative is default, or never concepts are used to indicate negation. Seam concepts can be modified by concepts like always, only, still, ever, forever, seldom, initially, and usually. Seam concepts can be constructed in exactly the same manner as other concept with join rows. For example:

was~not=wasnot
wasnot~always=wasnotalways
wasnot~still=wasnotstill
wasnot~ever=wasnotever In any case the text string of the seam will parse to a single seam concept ID#, which is used in join rows along with the subject and relative concepts to build an observation concept.

Then the observer-assessment parameter also defines which of the three types of relationship will apply in this observation, a BE, HAVE, or DO relationship. Let's define them: a BE relationship occurs when the relative is an adjective type complement or apposition type concept, to be joined to the subject concept to enrich it. A HAVE relationship occurs when the relative is a neighbor noun entity type concept. A DO relationship occurs when the relative is a verb phrase type concept.

The modality parameter: the seam concept also carries modality. Like do, modals can, will, may, shall, and always relate to a verb type relative. Does says the observer sees that the relation exists. Can says observer assesses it's reality as possible, may says there it's a probability, will says it's certain in the observer's mental computation, shall says the observer will make sure it's real, must says it's necessary.

Very often the seam is not found on one of the separate grammatical particles listed above but rather is encoded as the –s or –d inflection of the lexical verb in a predicate.

As well as giving the relation a quality of existence, existence "percolates" into to many of the accessory concepts of the observation concept. The subject concept becomes real and so do component concept used in the construction of the subject and verb concept.

The seam is the way language confers degrees of reality on states of being, events, and actions. The seam is how language confers degrees of reality on concepts and distinguishes reality from memory and the imagination.

Carrying reality, affirmation/negation, modality, voice, tense, aspect, finitivity, the seam is what makes a finite sentence a finite sentence.

There are three types of relative concepts, BE, HAVE, and DO types, which have their own characteristic features. They are concept-enriching concepts, which may be restrictive or non-restrictive.

Concept Enriching Concepts (BE type) are Complement concepts and Apposition concepts.

Neighbor (Noun) concepts (HAVE type): This type of relative concept is related to the subject concept by a have type seam. Interestingly, subject concepts are enriched by an entity relative via a have seam. Take the sentence "Jim has a son," which describes observation concept. Jim (subject) has (seam) a son (relative). A man who has a son is a parent. The added conceptual content he receives, the niche concept he gets from occupying the subject niche of this observation is the, a parent, apposition concept.

Verb Phrase concepts (DO type): The verb concept is the third type of relative concept. Subject concepts are enriched by a do seam relating a verb relative in a similar manner to enrichment by have seams relating a noun relative.

Pre- and post-modifiers, whose descriptor strings are set off by a comma in finite sentences, are used to provide important metadata, setting the context, background, circumstance, situation, milieu, environment, perspective, or framework of the observation. Some disclose who says, thinks, notices, or believes it. Some disclose under what conditions is it true. Others turn it into a quotation, a question, or an exclamation. They indicate how the observer sees or saw the relationship between the subject and the other concepts involved. It declares the newly formed complex concept and its parts to exist or not exist as the case may be; this quality of existence "percolates" into to many of the accessory concepts of the observation concept, its world, reality, and modality.

Language uses many wonderful and subtle means to frame observations. Modifiers come in all shapes and sizes but all can be managed by parsing their strings to a single concept ID# and making a join row join it to the observation concept. These modifier concepts add enormous versatility to an observation.

Generally, as explained in the '199 application, a composer who understands the meaning of sentences directs the process of building concepts in the database. An observation concept can be built in M5 with a series of join rows as described above. Triadconcepts fall into three formal types and play standard roles in an observation. It makes sense that a finite sentence delivers them to the second person in an expected order. The seam source text is usually one to three grammatical particles. FIG. 5 of the '199 application, which is recreated here as FIG. 3, is a flow chart illustrating an example process for constructing an observation concept in accordance with our embodiment.

First, in step 502, a unique concept ID# can be assigned to the observation concept being built. This step can be performed up front at the beginning of the process. The ID# can stand for the complete and final meaning of the observation from the outset. In certain embodiments, the observation concept ID#s can be generated using a domain location numbering schema. But as mentioned, other schemes can be used as well.

In step 504, a pre-modifier concept, if present, can be constructed. For example, the pre-modifier concept can be built and assigned a concept ID# so it can in turn be joined into the overall observation concept with a single Type 3 join row. Pre-modifier concepts are extremely various and versatile as discussed in more detail above.

Next, the main triad of observation can be constructed by connecting together the three triad concepts with appropriate join rows. We have coined the term xxx for triad concepts that are directly joined to the point of the observation. Thus, the subject concept can be built in step 506 and the seam concept can be built in step 508. In step 510, the first join is between the subject concept and the seam concept can be performed in order to form a binary concept.

The next concept to be joined on to this binary concept is the relative concept, which can be built in step 512 and joined in step 514. Like the subject concept, the relative concept can be pre-built and given a concept ID# so it can be joined in to the observation with a single join row.

The predicate, step 518, is a special case. The lexical verb of a predicate already carries the entire seam parameter and the basic verb concept bundled together. In a predicate the lexical verb with a –S inflection indicates real world now, and with a –D inflection indicates real world then, memory or imaginary world. And it's always affirmative, with a DO parameter, never BE or HAVE. No join row is needed to bind in the seam concept in sentences that consist just of subject-predicate word strings.

The other special case is when the subject concept is plural and world is real world, i.e., present tense. In this case the seam concept is found in –s inflection of the subject lexical noun and not on the lexical verb as in a predicate. Curiously, in English, this same –s inflection has been pressed into use to indicate plurality in nouns generally. When world is memory or imaginary and number is plural the –s inflection remains on the subject noun along with a –d inflection on the lexical verb of the predicate.

The appropriate join rows to make these observation concepts are:

Subject~verb-s=observation12 (singular-real world)
Subject~verb-d=observation31 (singular-memory world)
Subject-s~verb=observation44 (plural-real world)
Subject-s~verb-d=observation53 (plural-memory world)

Most finite sentences end here. However, some go in to add "a" after comma time, place, reason, or manner post-modifier phrase, step 522. These are very similar to the pre-modifier concepts. Again they should be pre-built, step 520, and have a concept ID# so they can be joined on to the observation with a single Type 3 join row.

All of the observation component concepts are encoded in the finite sentence by various natural language techniques. It is second nature for a literate second person to pick them off the text, to decode them. It is automatic. Our M5 composer must detect them and make sure they are added on to the observation correctly.

Translating a finite sentence, "At a most basic level, Richard Price's new book is a police procedural," into an observation concept.

First, observation concept ID # Observation32 is assigned to the observation, e.g., as this observation is being sourced from the second sentence of the third paragraph of the article. Observation32 is now the concept ID# of the whole sentence in this example.

An installer program can be configured to install the vocabulary rows into the database automatically.

Now, to prebuild the preceder concept (step 504) and the three core concepts of this observation (step 506-514): the installer constructs the preceder concept: "At a most basic level," e.g., producing concept ID# AAMBL. Next the subject phrase, "Richard Price's new book," becomes, e.g., subject concept RPNB. The seam concept is is. Then, relative concept, e.g., APP is translated from the apposition phrase "a police procedural."

Now it takes just three more join rows to build the observation concept itself.

AAMBL~Observation32=Observation32

Which joins pre-modifier AAMBL to the observation concept with the type 3 join row.

RPNB~is=RPNBis

Which joins subject concept RPNB to the observer-assessment concept is with the Type 1 join row RPNBis~APP=Observation32

Which joins concept RPNBis to the relative concept APP with a Type 1 join row to make the observation concept Observation32.

Now this set of vocabulary and join rows are sufficient to enable a parser to parse the complete sentence, "At a most basic level, Richard Price's new book is a police procedural," when it is, e.g., typed into the parser program.

One way to automate the construction of an M5 database disclosed in the '199 Application is to use concept templates. The various types of complex concept described in the '199 application have standard structures, which can be represented by standard sets of join-rows. Such standard sets of join rows are the concept templates. In templates the standard component concepts are given generic concept ID#s, which can be replaced by the actual concept ID#s of the subconcepts of the new complex concept to build that complex concept in M5.

FIG. 9 of the '199 application, which is recreated here as FIG. 4, shows the join rows of a functioning database template for an observation concept. Notice that the subcomponents of the observation Ob11 have been pre-assigned concept ID#s that reflect their position in the knowledge domain, i.e., S11 to the subject concept, V11 to the verb concept, and Or11 to the observer reality assessment concept.

When translating a finite sentence into M5, it is necessary first to develop each parapoint word string as a concept with its own concept ID# by creating the necessary join rows in an M5 table. Then to edit that concept ID# to the concept number pre-assigned for that particular parapoint in its template join row. Then to add this set to the template set.

The resulting sum set of join rows models the observation sourced from the finite sentence and allows that finite sentence to be parsed completely and also to parse when, where, how, and why questions associated with that finite sentence.

It is possible to construct a concept template for an entire domain concept. An M5 knowledge domain translated from a scientific paper or an article of 2000 words will consist of about 100 observation concepts averaging 20 words per sentence. A few more accrue from subordinate clauses, which also represent observation concepts, used in the construction of the formal concepts. Each observation concept template can be built with a set of 20-30 join rows, more if its concepts are complex. Certain other sets of join-rows can be added such as those that disambiguate deictics or define the niche concepts and response concepts that are used by a parser to interrogate the M5 domain with how and why questions; as explained below. When all of these rows are present and correct, one can interact with or interrogate the M5 table via the parser program at the same level that one can interact with or interrogate another person with the same knowledge.

Another type of concept for which it is useful to have a prebuilt concept template is the group concept. For example, to construct a group concept in M5 from the text "a king, a queen, and a beautiful princess." FIG. 10 of the '199 application, recreated here as FIG. 5, is the M5 group concept template database that can be used. This group concept template is constructed from source text "A, B, and C".

A parser program parsing input text "A, B, and C" against this template database finds its concept ID# and13 and outputs text "A, B, and C"

Figure 6:
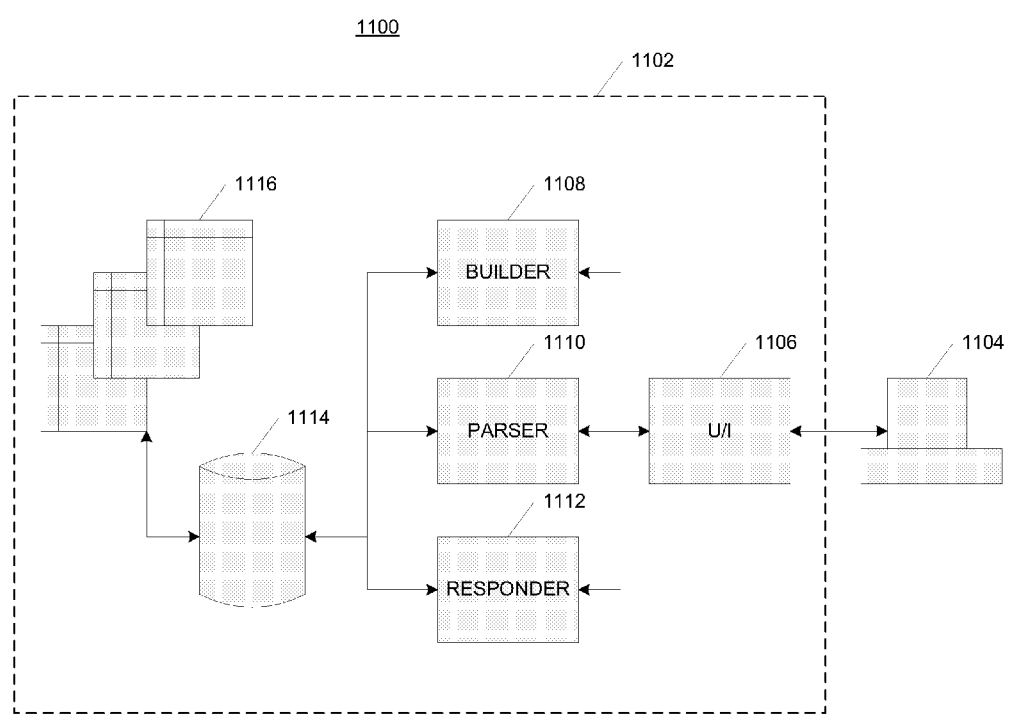
FIG. 6 is diagram illustrating an example system configured to construct and store the tables of FIGS. 1, 4, and 5 in accordance with one embodiment.

Here is an actual run of an example parser program:
QUESTION
A, B or C
ANSWER
A, B or C FIG. 11 of the '199 application, recreated here as FIG. 6, is a diagram illustrating an example system 1100 configured to carry out the processes described above. As can be seen, system 1100 includes the components of natural language processing system 1102 and a terminal 1104. Terminal 1104 can be used to interface with system 1102 and can for example be a laptop or desktop computer; a mobile computing device, such as a smartphone or palm computer; or any other type of computing device that can be configured to interface with system 1102.

System 1102 comprises a user interface 1106, which can be configured to interface system 1102 with terminal 1104; builder 1108; parser 1110; responder 1112; and storage 1114, which can be configured to store one or more tables 1116. User interface can, in certain embodiments, comprise text-to-speech processing (not shown), speech-to-text processing, or both.

Tables 1116 can comprise the data of various M5 databases formatted as described above. Builder 1108 can be configured to construct the tables in accordance with the rules and processes described herein. Once built, parser 1110 can be configured to parse text strings input through user interface 1106 using the tables in accordance with the rules and processes described herein, and responder 1112 can be configured to respond as instructed by responses stored in the tables.

It will be understood that system 1102 can be remote from terminal 1104 or can be included in terminal 1104. In general, system 1102 comprises the components, hardware and software, needed to implement the systems and methods described herein. The components comprising system 1102 can be co-located or distributed across multiple hardware platforms. For example, some or all of builder 1108, parser 1110, and responder 1112 can be implemented on one ore more servers or computers, which may also be configured to store tables 1116. In other embodiments, tables 116 can be stored remotely form the other components. Similarly, user interface 1106 can be co-located or remote from the other components.

It will be understood that the components illustrated in FIG. 6 do not necessarily depict all of the necessary components, nor is the arrangement illustrated intended to convey the need for a particular infrastructure. Rather, the components and arrangement illustrated are by way of example only.

Builder 1108 can be used to construct tables 1116, i.e., to build an M5 database. In this case, an input text string is used to drive the construction of a database table able to model each concept structure that each text string names. For example, using the same x,y grid, words and punctuation marks of the input text string can be copied ascending into the cells of column 1 as before. Now, instead of searching the table for joins of concept numbers the joins constructed using builder 1108. In other words, builder 1108 can be used to indicate which particular adjacent concepts make a legal join.

In certain embodiments, a mouse-drag can be used to drag a concept up or down the column and to drop it onto another. A unique product concept ID# of the join is generated and posted to a cell in the next column in the same row as the "surviving concept". A corresponding new join row defining the two component concepts and the product concept and documenting this join is added to the table. Concepts not involved on joins are posted as is to the next column. In this manner, the content of the grid filled out by actions of the composer using builder 1108 is identical to the content of the grid filled out by the parser program. Such a drag and drop process can, however, be time consuming.

Every concept can be assigned a unique concept ID that ideally needs to be generated automatically by builder 1108, though they can also be created and installed and edited manually in the table. Ideas need only be given unique numbers. The systems and methods described herein will work if these unique ID numbers are generated of example by a random number generating program or using a next accession

; however, it can be preferable to employ a methodology where the numbers generated have some meaning accessible to the administrator or user.

Thus, in certain embodiments, nearly all words, punctuation marks, prefixes, suffixes, and inflections are their own concept numbers. This can be done programmatically or by lookup table. There are occasions when it is useful to assign the same concept ID# to two different words if they are perfect synonyms in a particular context. For example it has been found useful to give both words "an" and "a" concept ID# a.

One method of generating unique concept ID#s from strings of words and punctuation marks is to concatenate upper case initials and punctuation marks of the preferred language phrase that describes the concept. For example, builder 1108 can be configured to generate the product concept number of a join of two words by concatenating upper case initials of the two words to form an acronym, initialism or alphabetism, that becomes the concept ID# of the word string. For example the product concept obtained by joining concept green to concept tree would be concept GT. Since GT is still tree enriched by green it is the surviving concept, GT is posted to the row of tree not of green in the concept building grid. When two upper case initialisms are joined, they can simply be concatenated. When a word concept is joined to an initialism, the initial of the word can be concatenated with the initialism.

Under this system of concept ID# generation, the concept ID# of any string will in most cases be the initialism made up of upper case initials of the entire string in same order. This is the basis of a very simple algorithm to generate the concept ID# of a string; however, this simple, quick methodology is not generally useful because the information as to where the joins occurred is lost, and the table of joins essential for parsing an unknown string will not be built. A simple, quick methodology for dealing with this issue will be described below.

Another important method of generating concept ID#s is to use locations in the domain as concept ID#s; however, any schema that generates unique concept ID#s will work with parser 1110.

It is also possible to model each clear idea or concept as a software object, employing object oriented programming, as an alternative to representing one as a database record. One can capture the properties of the concept, its relationships and make use of inheritance to enrich concepts.

Such an implementation, new information can be added in the form of a website, able to serve the application to as many people at the same time as the hardware can manage. For example, built on entirely free and open source software, a Linux server, using a Java application server Tomcat, and a MySQL database, such an embodiment can allow multiple people to work on the same "knowledge domain" or different people to work on different knowledge domains, or two or more people to work together on one knowledge domain. You can create an empty knowledge domain, and add users or edit a user's profile and add knowledge domains that they are allowed to read or read and modify.

In such implementations, database 1116 can be constructed of 3 main tables, each of them dealing with concepts and the interrelations between concepts. In this version, each concept can be instantiated, e.g., as a java.lang.Object, the class from which it descends. In a single inheritance class hierarchy (called glace.*), there are 9 different classes of Concept, each of them deriving originally from glace.Concept.

The concept types can be: Unknown, SimpleLexical, Motor, CompoundLexical, Complex, SeamMember, Seam, Look, See, Observation, and Schema. And each of them can be constructed from a main concept table, with many associate tables joined in. These 9 types of concept increase in complexity, and share common "components" of which there are quite a number. The specifics of these components make up the properties of the concept, and determine their complexity.

The collection of objects, stored in the database, can be located anywhere on the Internet, and queried by any parser 1110 allowed to access it. Web services can be configured to receive either inputs or outputs between ks, and XML documents describing Concepts and groups of Concepts can be passed between knowledge domains, for adding, modifying, enriching, or querying concepts. In this way, 2 or more independent knowledge domains can be combined to cover a domain of knowledge deeper than any single knowledge domain can.

As noted in the '199 application, translating language into an M5 database format is akin to a writer writing well. The systems and methods described below are designed to help make this process easier and more automated.

The systems and methods that follow are based on the concept that the chief operation of the mind is a binary operation that replaces two concepts with a single product concept. All three of the language elements, lexical words, grammaticals, and punctuation marks, are treated as symbols that stand for mental concepts. Algebraic expressions specify a series of binary algebraic operations that replace two adjacent operands and an adjacent operator with a single product operand. Similarly, in the systems and methods described herein, language expressions specify a series of binary mental operations that replace two adjacent concepts and the implicit mental operator with one product concept.

With this in mind, operator symbols can be appropriately placed in the text in a word processor, employing the principles of postfix Reverse Polish Notation (RPN). A builder program 1108 can then be configured to automatically construct a M5 table from the marked up text. In other words, by defining the precedence with which concepts are combined, the operations that must be performed on a string of text can be made clear such that generation of an M5 database can be automated.

For example, it is well known that arithmetic expressions specify a series of binary operations, where in each operation an operator combines two operands into a single result until a single numerical result is obtained that represents the value of the entire expression. An algebraic expression must contain all the operands and operators, which will always be (n) operands and (n−1) operators, in the order needed for it to be evaluated to a single value. For example, in evaluating the equation:

$$y=304*(637+214)/19 \text{ for } y,$$

the three operations that a calculator finds to perform in order are: 637+214=851, 304*851=258704 and 258704/19=13616. Notice that the intermediate product operands, 851 and 258704, that are generated on the way to the final value of the expression were not explicit in the original expression. At each step of this process two adjacent operands and the operator are replaced by an intermediate result term, which will become an operand in a later operation. A classic algorithm for combining the operands according to the above operators and the implied order is RPN, which will cause the correct operations to be performed, one at a time, innermost first, and obeying the rules for precedence of operations. This iteration continues until there is only one term left, which is the value of the expression.

Each operation is an equation where two operands and an operator are declared to be equal to a product operand, which replaces them in the next round. It will be realized that a list of the three operations above, 637+214=851, 304*851=258704, and 258704/19=13616, would be an alternate equivalent notation for the expression 304*(637+214)/19. Similarly, a simple table of the binary operations needed to evaluate a textual expression, precalculated, can be used as an alternate notation for that expression.

In a M5 database table the list of equations that represent the expression 304*(637+214)/19 can be represented by three rows embedded in a database table that may contain thousands of similar expressions as shown in Table 1.

TABLE 1

| | |
|---|---|
| 1073 | ...~...=... |
| 1074 | ...~...=... |
| 1075 | 637 ~ 214 = 851 |
| 1076 | 304 ~ 851 = 258704 |
| 1077 | 258704 ~ 19 = 13616 |
| 1078 | ...~...=... |
| 1079 | ...~...=... |

Operators *, +, and / are not identified because they are implied by each precalculated result, and a tilde stands in for the unspecified operator. Each equation is of the form y=f(a, b), where the function is not specified. One can infer that the ~ in the first row is the addition operator, in the second multiplication, in the third division. With table lookup there is no need to actually perform the computation. It is necessary that intermediate operands, 851 and 258704, be explicit and precalculated in this M5 table.

A run of this table driven by a parser program 1110 is shown in Table 2.

TABLE 2

| |
|---|
| 13616 |
| 258704 ~ 19 |
| 304 ~ 851 19 |
| 304 637 ~ 214 19 |

Parsing along expression 304 637 214 19 from left to right, the parser program 1110 looks in Table 1. In the first pass over this expression parser 1110 finds 637~214=851 in the table and replaces operands 637 and 214 with 851, resulting in a new row, 304~851 19. Then, in a pass over this row, the parser 1110 finds one operation to perform, 304~851=258704, replacing operands 304 and 851 with 258704, resulting in new row 258704~19. In the third pass parser 1110 finds and performs operation 258704~19=13616 leaving final result 13616, or y=13616.

Note that when M5 notation is used to denote an arithmetic or algebraic expression, the values of operators are implicit, precalculated intermediary operands are explicit, the table controls precedence of operations, and no computations have to be performed; however, each subset of database rows enables evaluation of just this one expression, just as one line of the multiplication table precalculates only one multiple. This may seem to limit the usefulness of the method at first, but it will be seen that these properties of M5 notation make it possible to bring the principles of algebraic evaluation to parsing of language expressions in a very practical way.

For example, let the words of the language expression, "the contribution of a given non-CO2 greenhouse gas to radiative forcing", be considered as if it were an algebraic expression made up of eleven explicit operand concepts and ten implicit mental operators. The words of the above expression can be represented with single letter symbols, i.e. the upper case initials of its words: T C O A G N G G T R F. When this language expression of eleven explicit operand concept symbols and ten implied mental operators is input, the parser 1110 can be required to extract and execute the ten operations that are entailed.

| | | |
|---|---|---|
| 344 | ...~...=... | |
| 345 | ...~...=... | |
| 346 | G ~ G = 2 | "greenhouse gas" |
| 347 | R ~ F = 9 | "radiative forcing" |
| 348 | N ~ 2 = 3 | "non-CO2 greenhouse gas" |
| 349 | T ~ 9 = 10 | "to radiative forcing" |
| 350 | G ~ 3 = 4 | "given non-CO2 greenhouse gas" |
| 351 | A ~ 4 = 5 | "a given non-CO2 greenhouse gas" |
| 352 | O ~ 5 = 6 | "of a given non-CO2 greenhouse gas" |
| 353 | C ~ 6 = 7 | "contribution of a given non-CO2 greenhouse gas" |
| 354 | T ~ 7 = 8 | "the contribution of a given non-CO2 greenhouse gas" |
| 355 | 8 ~ 10 = y | "the contribution of a given non-CO2 greenhouse gas to radiative forcing" |
| 356 | ...~...=... | |
| 357 | ...~...=... | |

Table 3 shows the table of mental operations encoded in this language expression, 10 rows of binary equations embedded in a larger table perhaps holding in common many other expressions. It can be important for intermediary unit concepts at each stage of construction and the final concept to be given an arbitrary but unique symbol identifier, in this case their own unique integer identifier, e.g. 9 stands for "radiative forcing."

Table 4 shows how a table driven parser can parse this language expression if it has access to Table 3.

TABLE 4

| |
|---|
| y |
| 8 ~ 10 |
| T ~ 7  10 |
| T C ~ 6  10 |
| T C O ~ 5  10 |
| T C O A ~ 4  10 |
| T C O A G ~ 3  10 |
| T C O A G N ~ 2  T ~ 9 |
| T C O A G N G ~ G T R ~ F |

Parsing along this string of concept symbols from left to right, consulting Table 3, parser 1110 finds two operations it can perform: G~G=2 and R~F=9 in the first pass. This results in a new row T C O A G N 2 T 9. In the second pass on this row the program performs one operation, N~2=3, resulting in new row T C O A G 3 10. This continues until parser 1110 has performed the ten operations coded in the table, substituting two concepts for one each time; until only one term is left, concept y, which represents the meaning of the whole expression.

The only information a computer needs to be given to be able to automatically construct a M5 database from a text input is precedence of the binary operations encoded in the text. Thus, M5 tables can be constructed by indicating precedence of operations in the text and then inputting that into a builder 1108 can than can understand the operations and precedence and automatically generate a M5 database. For example, in one implementation, the operations can be inserted by mouse drag and drop of concepts.

Evaluating an algebraic expression by consulting an operation table works because the table indicates which pairs of operands can be operated on, thus dictating precedence of operations, and provides lookup of the product of each operation, eliminating the need for calculation.

Alternatively, it is possible to evaluate an expression if explicit operators are provided and there are means of performing calculations. For example, the algebraic RPN expression, 2 3 4×+, evaluates to 14 as a result of 2 operations, 3+4, producing intermediary operand 7, and 7*2. These operations and their precedence can also be dictated by RPN notation. RPN calculators use a super efficient stack based algorithm to evaluate expressions. The stack-based algorithm for evaluation of postfix RPN expressions is as follows:

Start at beginning of RPN expression
    get next token (operator or operand) from the input expression
    if the token is an operand
    push it onto the stack
    loop until next token is an operator
    if the token is an operator
    pop the top two operands from the stack
    perform the operation
    push the result operand back onto the stack
    repeat along expression until there are no more tokens and a single operand is in the stack
    end The result is a single operand at the top of the stack, which is the value the whole expression represents.

An observation concept represents a rule, law, custom, or policy when the state, event, or action occurs or is expected to occur on many occasions, or in may locations or circumstances.

The RPN calculator program evaluating 2 3 4×+ runs as follows with precedence of operations being directed by the placement of the two operators:

| Token | Action | Stack |
|---|---|---|
| 2 | push 2 | {2} |
| 3 | push 3 | {2, 3} |
| 4 | push 4 | {2, 3, 4} |
| × | pop 4, pop 3, multiply, push 12 | {2, 12} |
| + | pop 12, pop 2, add, push 14 | {14} |

An equivalent of RPN to place operators appropriately in source text can be implemented in order to quickly generate a M5 table. Apposite placement of operators in a language expression in reverse Polish notation can provide a computer program with precedence for mental operations, just as RPN provides precedence of binary operations to a calculator. But, unfortunately for computer programs, natural language leaves out the operators seen in algebraic expressions, so operation tables are essential for computer programs to parse text not marked up. Accordingly, the meaning of text input can easily stipulate precedence of operations for an expression by inserting ordered generic operator symbols into the text at appropriate points, e.g., following postfix RPN rules. In other embodiments, prefix and infix notation can be employed as well to achieve the same end.

As an example of text markup, take the following ambiguous text string, which can parse two ways:

"I saw the Statue of Liberty, flying in from Boston last evening."

This text string has 14 (n) language elements, 12 words plus 1 comma and one period. Punctuation marks are stripped off words and considered to be language elements just like words. To mark up a text expression with operators, 13 (n−1) operator symbols (carets) must be inserted in the text. To place operator symbols, concepts that combine to form a compound concept must be identified. In this example, the first pair of operators that can be combined is "I saw." A caret operator symbol can be inserted after "saw" so that the builder 1108 will recognize that these two concepts are to be combined. The next is "the Statue" so an operator can be inserted after "Statue". And so on until the 13 operators are placed in, e.g., correct RPN. The product is a string of symbols, 14 (n) operand symbols and 13 (n−1) Reverse Polish operators appropriately placed as shown:

I saw ^ the Statue ^ of Liberty ^^^, ^ flying in ^ from Boston ^^ last evening ^^^. ^.

To build a table from this marked up text the builder 1108 will move from left to right and each time it hits a caret ^, it will combine the immediate prior two concepts to form a complex concept. Thus, the builder 1108 will combine I and saw, the and Statue, and of and Liberty, as a result of the first three carets ^ moving left to right. Then the builder 1108 will hit another caret ^ so it will combine the two complex concepts "the Statute" and "of Liberty" into a single complex concept. The next caret will then cause the builder to combine the concept "I saw" with the just formed complex concept "the Statute of Liberty" to form a complex concept "I saw the Statute of Liberty". The next caret after the comma will direct the builder to combine the just formed complex concept with the comma. The builder will then go on to form the complex concept "flying in form Boston last evening" and combine it with the "I saw the Statute of Liberty," concept.

If the text is marked up differently, then it will have a completely different meaning due to the precedence of operation. For example, if it is marked up as follows:

I saw^ the Statue^ of Liberty^ ^ flying in^ from Boston^^^ ^,^ last evening^^.^

Here "the statue of liberty" combines with "flying in from Boston" to form the concept "the statue of liberty flying in from Boston, "This concept combines with "I saw" to indicate that this is what I saw. Now, "I saw the statue of Liberty flying in from Boston" would give the reader the impression that the Statute of Liberty was flying. Notice that the comma that was separating "I saw the Statue of Liberty" from "flying in from Boston" has been moved.

Accordingly, the importance of properly placing the operators can be seen. If the operators are not placed correctly, then an entirely different result can occur, just as when the operators are placed in the wrong order in an algebraic equation. Further, it is obviously important to have the correct number of operators. This can be easily checked, however, since there should always be (n−1) operators.

Once source text is marked up to include the appropriate operator symbols, the table builder 1108 can automatically construct a M5 table as follows:

Input text string into the first row of an x,y array
    Starting on left of input text string, work along the string
        find 2 operand symbols followed by an operator symbol
            replace these three elements with a newly generated operand symbol
        write an M5 row to the M5 database that reflects this binary operation
    continue to end of string Loop back to start on left until only there is only one operand symbol in the string In this example, the builder will run 1108 will run 7 loops to get to a single operand from the above language text as illustrated below:

```
                    I14
                    I13 . *
          I7                     F6 * . *
        I6 , *                   F6 * . *
      IS   T4 * . *          F4    LE * * . *
      IS  TS  OL * * . *    FI  FB *  LE *  * . *
```

I saw * the Statute * of Liberty* * * , * flying in * from Boston * * lasting evening * * * . *

Two things are happening in the above example. First, a tilde or an asterisk * is being inserted to illustrate when the preceding two words, or concepts should be joined and in what order. Second, as the concepts are being joined, or prior, they are being replaced by some sort of symbology such as a capital letter representing the first letter of the word concept, or a number to illustrate a more complex concept. Thus, for example, as the builder moves from right to left, it will replace I with "I", saw with "s", and then combine them into the "IS" symbol. Continuing, the builder 1108 will replace the with "t", Statue with "S", and then combine them into "TS". Continuing, the builder 1108 will replace of with "O", Liberty with "L", and then combine them into "OL".

Next, the builder 1108 will combine "TS" and "OL" into "T4" as a result of the second asterisk * following Liberty. It will be understood that the symbology for this combination could have been "TSOL", or some other symbol, but the above symbology does have the advantage of being shorter. The builder 1108 will then combine "IS" and "T4" into "I6" as a result of the third asterisk, following Liberty, and then combine "I6" and the comma into "I7" as a result of the fourth asterisk following Liberty.

At this point, the builder will continue moving left to right by replacing flying with the symbol "F" and in with the symbol "I". The builder 1108 will then combine these two into the symbol "FI". The builder 1108 will then replace from with "F" and Boston with "B", and then combine the two into "FB". The builder 1108 will then combine "FI" and "FB" into "F4".

The builder 1108 will then replace last with "L" and evening with "E", and then combine them into "LE". The builder will then "F4" with "LE" to form "F6" as a result of the second asterisk * following evening. The builder will then combine "I7" with "F6" to form "I13", and then combine "I13" with the period to form "I14".

Thus, using the notation above, i.e., the symbols and asterisk operators, a builder 1108 can automatically form all the join rows necessary to parse the above sentence. At each replacement of three tokens, i.e., two operands and an operator, the builder 1108 can write a join row into an associated M5 database.

For example, looking at the prior example, the following 13 rows will be written automatically to the Maven database:

1. I * saw = IS            "I saw"
2. the * Statue = TS       "the Statue"
3. of * liberty = OL       "of Liberty"
4. TS * OL = T4            "the Statue of Liberty"
5. IS * T4 = I6            "I saw the Statue of Liberty"
6. I6 * , = I7             "I saw the Statue of Liberty,"
7. flying * in = FI        "flying in"
8. from * Boston = FB      "from Boston"
9. last * evening = LI     "last evening"
10. FI * FB = F4           "flying in from Boston"
11. F4 * LI = F6           "flying in from Boston last evening"
12. I7 * F6 = I13          "I saw the Statue of Liberty, flying in from Boston"
13. I13 *. = I14           "I saw the Statue of Liberty, flying in from Boston."

As another example, the following concept can be marked up with the correct operators in order to allow builder 1108 to automatically create an M5 table: "push the result onto the top of the stack". Here, instead of tildes or asterisk *, the operator symbols are the first letter of the first concept being combined. Thus, the marked up version will appear as follow:

push the result T P onto the top T of the stack T O T O P

When this marked-up text is input into a stack based builder 1108, it will parse the expression as follows, generating a symbol for the intermediary concept product after each binary operation:

| Token | Action | Stack |
|---|---|---|
| push | push push | (push) |
| the | push the | (push, the) |
| result | push result | (push, the, result) |
| T | pop result, pop the, operate, push TR | (push, TR) |
| P | pop TR, pop push, operate, push PTR | (PTR) |
| onto | push onto | (PTR, onto) |
| the | push the | (PTR, onto, the) |
| top | push top | (PTR, onto, the, top) |
| T | pop top, pop the, operate, push TT | (PTR, onto, TT) |
| of | push of | (PTR, onto, TT, of) |
| the | push the | (PTR, onto, TT, of, the) |
| stack | push stack | (PTR, onto, TT, of, the, stack) |
| T | pop stack, pop the, operate, push TS | (PTR, onto, TT, of, TS) |
| O | pop TS, pop of, operate, push OTS | (PTR, onto, TT, OTS) |
| T | pop OTS, pop TT, operate, push TTOTS | (PTR, onto, TTOTS) |
| O | pop TTOTS, pop onto, operate, push OTTOTS | (PTR, OTTOTS) |
| P | pop OTTOTS, pop PTR, operate, push PTROTTOTS | (PTROTTOTS) |

The final symbol, PTROTTOTS, left in the stack is the symbol representing the whole expression.

Thus, using the operator notation above, text input can be generate that can allow a builder 1108 to automatically generate an M5 database table. In certain embodiments, a checker program can also be included, or incorporated into builder 1108, an configured to check the input string to ensure that the proper number of operators is included.

For example, the following text can be prepared and provided to builder 1108:

"Disney will acquire Marvel in a $4 billion deal, bringing the Hulk and 5,000 comic-book characters into the Disney fold."

Here is the same text marked up with ^ operators:

<2.2.50>Disney will acquire Marvel^^^ in a $4^ billion^ deal^^^,^ bringing the Hulk^ and 5,000 comic book^ characters^^^^ ^ into the Disney fold^^^^.^

First, the notation <2.2.50> can be used to indicate the paragraph and sentence addresses in the table. Further, a simple count will reveal that there are When this text string, with operators, in input to the builder, or separate checker, an error message can be generated when the checker checks the number of operands and operators. This is because there are 24 (n) operands, but only 21 operators, while there should be 23 9n−1) operators. Thus, when the checker is run, the following message can be generated:

"Paragraph 2 Sentence 2."

"Disney will acquire Marvel^^^ $4^ billion^deal ^^^ ^, ^ bringing the Hulk^ and 5,000^^^^ comic book ^ characters ^^^^ ^ into the Disney fold^^^^. ^

The number of ^ is 20. There should be 22"

Such a message can indicate that there are two operators missing in sentence two.

The text can then be marked up to add the two missing operators:

Disney will acquire Marvel^^^ in a $4 billion^ deal^^^^,^ bringing the Hulk^ and 5,000 comic book^ characters^^^^^^ into the Disney fold^^^^.^

The builder, or checker can then be rerun and the text should pass. FIG. 7 is a diagram illustrating the M5 database that can be automatically built from the above text input string by the builder 1108 once the checker has been run and passed.

Using the above, applications of all sorts can be designed and built that take advantage of the ability to speak, or type text into a computer in natural language and have the computer understand the text and respond appropriately. Language, a vast combinatorial system, is a powerful method of precisely identifying a particular concept out of trillions, perhaps best described by Steven Pinker:

"The fact that grammar is a discrete combinatorial system has two important consequences. The first is the sheer vastness of language. Go into the Library of Congress and pick a sentence at random from any volume, and chances are you would fail to find an exact repetition no matter how long you continued to search. Estimates of the number of sentences that an ordinary person is capable of producing are breathtaking If a speaker is interrupted at a random point in a sentence, there are on average about ten different words that could be inserted at that point to continue the sentence in a grammatical and meaningful way. (At some points in. a sentence, only one word can be inserted, and at others, there is a choice from among thousands; ten is the average.) Let's assume that a person is capable of producing sentences up to twenty words long. Therefore the number of sentences that a speaker can deal with in principle is at least 1020 (a one with twenty zeros after it, or a hundred million trillion). At a rate of five seconds a sentence, a person would need a childhood of about a hundred trillion years (with no time for eating or sleeping) to memorize them all." Steven Pinker, The Language Instinct, p. 85-6.

Language has the ability to precisely express a virtually infinite number of complex concepts. But, surprisingly, it is also possible to say exactly the same thing, to express the very same concept, in billions of different ways. Pronouns, synonyms, epithets, paraphrases, synecdoche, metaphors, etc., are all commonly used in sentences to express the same concept. One can use active or passive voice and the order of words and phrases can often be changed without altering the meaning of the text input. In one study using the systems and methods described herein, it was demonstrated that a particular 24 word legal statute could be worded in tens of billions of different ways and still accurately state the law. It was shown that a parser as described herein can be programmed to recognize all of the billions of wordings that reflected the law precisely and reject all of the billions of variants that did not.

This is because such a parser is able to parse small or large text inputs and recognize particular passages in the input text that have an expected meaning if it is a concept registered in the parser's table of concepts. The parser can detect registered concepts in text no matter how they are phrased. The ability to recognize complex concepts in text no matter how they are phrased has many applications in the management of the unstructured and semi-structured information stored in text.

It is possible to take advantage of this feature of language, the fact that language is a vast combinatorial system. Two applications will be described but just as examples of the value of the method which has uses in many other contexts.

The first example application is an interface with the computer whereby complex instructions can be given to the computer in free text, be understood perfectly and responded to appropriately and directly the first time. Google, for example, has a facility like this that aims to provide the one right response to a search entry, as described in Wikipedia: "Google's homepage includes a button labeled "I'm Feeling Lucky". When a user clicks on the button the user will be taken directly to the first search result, bypassing the search engine results page. The thought is that if a user is "feeling lucky", the search engine will return the perfect match the first time without having to page through the search results. According to a study by Tom Chavez of "Rapt", this feature costs Google $110 million a year as 1% of all searches use this feature and bypass all advertising"

In the spirit of "I'm Feeling Lucky", the invention proposes a "Universal Portal" toolbar on computer screens or smart phones where users can input free text such as a request, instruction, order, question comment, or other message. The main goal of the Universal Portal would be that it would provide direct access to any web page address on the Internet removing the need to ever visit the home page of the web site it is on. An important property of the Universal Portal is that it be a standard fixture on the main screen of a majority of computers and smartphones, ready for text input without having to navigate to it. Such a Universal Portal could be integrated into a browser application, popular search engine web page, or even an operating system like Microsoft Windows 7. There are several current text input fields like the browser address bar (location bar or URL bar) or the Google search box that could function as Universal Portal without interfering with their present functions.

All text entered would be processed by the parser program to see if a known registered concept is expressed in the text. To be recognized by the parser a text input has to make sense and be registered, i.e., be one of the concepts encoded in the table of operations of the parser program. The parser would intercept only registered concepts, which are actionable and pertinent. These very specific "filters" or "interceptors" would be transparent to regular search entries and not interfere in any way with the regular function of the browser. They would ignore search criteria composed of ordinary key words and text with other meanings, and so could be seamlessly employed on the front end of search engines or smart phones.

As a further enhancement of this application, once an expression has been received, recognized and acted upon by the user, a short "tag" of several characters will be provided, which can be used later to send the same long message again, like a code, shortcut or password for this message alone. Tags would be generated and offered to the user, or solicited. Tags, short character strings, can be edited by the user so they can be more easily remembered. If a user cannot remember a tag, he just need enter any understandable version of the original long message again to obtain the response and be reminded of the tag. The tag would routinely be the first part of each acknowledgement and response to reinforce user memory. Tags are managed in cookies placed on the user's computer(s) so that they would be private to that user and only work from a computer or smart phone in the purview of the user. This would allow the same short tag to be used by many different users for different messages without interference.

EXAMPLES

"Please place a phone call to Wall Street Journal subscriptions" tag: "WSJtel"

"Please call my Visa Customer Service" tag: "VCS"

"Picasso Las Vegas, make dinner reservations for two tonight at 6.30" tag: "PLV2dt630"

"Run Microsoft Word" tag: "word"

"Show me my email" tag: "mail"

All messages or short tags would be input into the same portal resident on the desktop whether directed to one's own computer or to any website on the internet. Providing access to thousands of favorite links is an alternate form of the standard "favorites" function available on PCs, and very convenient because of the tag reminder feature. If you have forgotten the tag just type in the request in your own words and it will be recognized and the user will be reminded of the tag provided for use the next time. In our experience with a working version of this favorites system, one quickly starts using it rather than conventional favorites or desktop icons.

Businesses may be interested in owning particular messages and tags, e.g., as trademarked properties that would take users directly to their web site in the mode of "I'm Feeling Lucky." Users could directly order particular products or services as an immediate result of text entry without further navigation from a business if they were built into the Internet repertoire of the business. Placing a cookie, with the user's email, billing info, etc., on the user's computer to register the user with the business would allow them to provide very personalized service. For example, Google could register consenting FTL users, putting email, shipping address and credit card information in a cookie like Amazon does to facilitate online purchases. Because of vast combinatorial nature of language, billions of these properties can be created without interference with each other. Search engines can generate a new source of revenues by creating and selling these messages to businesses and vendors.

Such an application has the ability to change online advertising. For example, online advertising is encroaching on advertising in the traditional media, newspapers, magazines and catalogs, billboards, radio and TV. The web pages of Internet containing information of all kinds now viewed by billions of interested users for hours every day, has become an enormous and rapidly growing billboard where very effective and economical advertisements can be placed.

And, traditional print, radio and TV advertisers have embraced the Internet in that 95% of print advertisements and most radio and TV commercials now carry a web address that provides more information in depth about the product or service being advertised; however, web addresses or URLs in such advertisements are awkward to use, remember, or both. One has to type in an HTTP Web address, which can often be very long, in letter-perfect fashion. A short URL typically takes you to the advertiser's home page and you have to navigate from there.

But Maven technology can be used to make it easy for customers to get to Web pages that amplify the print ad without having to remember and text in long Web addresses, or navigate Google to the Web page the advertiser wants them to see. And at the same time provide a new Internet product on the scale of AdWords through the use of a universal portal.

Such a portal can be built around Free-text-Links (FTLs) that can be used to access a specific web page, e.g., associated with a print or television add.

The number of concepts that language can mean with very few words is virtually infinite. Thus, there will never be a shortage of FTLs or problems with contention that is not easily dealt with. In other words, there are many variant paraphrases can precisely state the same concept. Easily composed FTLs can be defined that are human machine interface instructions that can be very specific. Mavens can be built to recognize almost any same meaning variant, at least all the ones most likely to be used, even very long ones.

M5 technology can then be used to obtain the concept in text, e.g., and FTL, that is input into the universal portal no matter how it is worded. The FTL can be embedded in a, e.g., print add instead of a traditional URL. When users read the suggested text, i.e., FTL, in, e.g., a text-link box in an advertisement they need only remember the concept not the actual words. Because even of they do not type the exact FTL into the universal portal on their computer, the associated parser, or Maven will still decode it properly and direct them to the correct page. Thus, the user can enter any fairly accurate paraphrase of the suggested text and M5 technology will recognize the concept and navigate to the Web page desired, which is important because it may be quite sometime before the user gets to a computer after seeing the add, e.g., in the newspaper or magazine.

In addition to print, television and radio advertisers, catalogs are another group of print advertisers who could make buying easier by taking customers right to checkout for the SKU.

Revenue can be generated on a pay per look basis.

A separate but related application is a computer method for performing a custom search of a large body of text looking for all instances of a particular concept in the text. This application can be referred to as a "text trawler". This can be viewed as a more comprehensive version of the "find" facility of current computer word or document processors, which can rapidly search through documents and highlight each instance of a particular word.

Such a application can comprise building an M5 probe database, i.e., a regular M5 table with a relatively small number of vocabulary and mental operation rows that would be sensitive to and able to find fragments of text expressing, meaning, a particular concept, no matter where the text expression was located or what synonyms and paraphrases were used in the expression, or in what order as long as the meaning is preserved. It is important that the probe be built with some care so as to contain all of the vocabulary words that can be used to express the sought concept and be able to parse-t0-concept all of the various synonyms, paraphrases, metaphors, pronouns, etc., that might be employed to express the concept sought.

The parser program can then be bound to an M5 database specifically designed to detect any string of words in text being searched that parses to the particular concept sought. The text document(s) to be searched for a particular known concept would be input into the parser, which would attempt to parse it word by word for the concept. The parser program can translate any text expression with specific meaning to a single concept. And any text string that has the same meaning will translate to that same concept. The parser can also detect hidden boundaries in expressions and sentences so subconcepts also represented in the table can be found. Candidate word strings are identified ion the text only when they are continuous unbroken strings formed solely from vocabulary words registered in the probe database. Words and phrases, concepts, not registered in the probe database are ignored. Then, only when a word substring is reached that parses to the sought after concept will a "find" take place and be presented to the searcher. This trawler facility can find instances of whole paraphrases and even sentences that have the meaning being sought.

Once found a concept's locations in a text body will be recorded, and organized into a concept concordance, which will allow rapid search of preprocessed text by searching on the corresponding concept database, optionally employing the use of Boolean search methods. A Boolean search on concepts as if they were keywords will significantly enhance search quality compared to current keyword search. Search now becomes a search for concepts rather than words.

Search engines routinely use a technique of simultaneously searching on synonyms for each search term entered. This improves engine search results. Search engines may activate "synonym search" automatically, and in Google, placing a tilde in front of a search term forces search on all the synonyms for that term. But, the "synonym" search facility of search engines is now limited to about 8 synonyms for each search entry word.

A third example application, in effect, enable synonym search to be expanded to billions of "synonyms" for each search entry, i.e. all of the periphrastic expressions and sentences that mean the same thing. This third example application aims at improving search engine performance by employing a builder program as described herein to translate whole large bodies of textual content into an M5 database of concepts representing the same knowledge that is in the text. Documents published in structured M5 database format are eminently more searchable by a computer than unstructured free text. The text markup method described above makes it practical for authors submitting material to markup text by inserting operators in the text to explicitly specify how the text is to be parsed so that computers would be able to obtain the correct concepts expressed, and make an M5 translation automatically. Thus, texts could be published in two media, as text for human reading and as an M5 database for computer reading. It is envisioned that in the future all documents will be published in both media These concepts could then be organized to produce a concept concordance, which would allow rapid search of preprocessed text by searching on the corresponding concept database, optionally employing the use of Boolean search methods. This allows Boolean search on concepts as if they were keywords creating a further opportunity to enhance search quality compared to current keyword search. Search now becomes a search for concepts rather than words.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A system for knowledge representation in a computer that can enable natural language communication with a computer, comprising:
   a database;
   a builder interfaced with the database, the builder configured to construct at least one table that represents knowledge defined by one or more text expressions, each of the one or more text expressions comprising (n) operands and (n−1) operators, wherein the builder is configured to construct the table by, for each text expression,
   combining sub-concepts in the text expressions into higher order sub-concepts, according to precedence defined by the operators, until the higher order sub-concepts join to form a concept that represents the entire text expression,
   associating each of the concept and sub-concepts with a concept identifier, and
   storing the concept, sub-concepts, and associated concept identifiers in at least one table in the database.

2. The system of claim 1, wherein the builder is further configured to assign the associated concept identifier to each of the concept and sub-concepts.

3. The system of claim 1, further comprising an input tool configured to allow an administrator to input the operators into the one or more text expressions.

4. The system of claim 1, wherein the associated concept identifiers comprise one or more of numeric identifiers, alphanumeric identifiers, random numbers, acronyms, words, and letters.

5. The system of claim 1, wherein the builder is further configured to construct a concept identifier from a first letter of each word comprising the associated concept or sub-concept.

6. The system of claim 1, wherein the builder is configured to construct a unique concept identifier from a word comprising a sub-concept.

7. The system of claim 1, wherein the one or more text expressions comprises words, and punctuation, and wherein the builder is configured to generate a sub-concept to represent each of the words and punctuation, based on the precedence defined by the operators.

8. The system of claim 7, wherein the builder is further configured to form higher order sub-concepts by joining first order sub-concepts expressed by the words and punctuation, based on the precedence defined by the operators.

9. The system of claim 1, wherein the at least one table comprises rows, and wherein each row comprises a relation between one of the concept or sub-concepts and its associated concept identifier.

10. The system of claim 9, wherein each row of the at least one table further comprises meta data.

11. The system of claim 10, wherein the metadata comprises a vocabulary representation, if applicable, and a textual representation of the associated concept or sub-concept.

12. The system of claim 9, wherein one or more rows of the at least one table further comprises a response.

13. A method for enabling natural language communication with a computer, the method comprising:
   receiving a text expression comprising (n) operands and (n−1) operators;
   combining sub-concepts in the text expression into higher order sub-concepts, according to precedence defined by the operators, until the higher order sub-concepts join to form a concept that represents the entire text expression,
   associating each of the concept and sub-concepts with a concept identifier, and
   storing the concept, sub-concepts, and associated concept identifiers in a database.

14. The method of claim 13, further comprising assigning the associated concept identifiers to each of the concept and sub-concepts.

15. The method of claim 13, further comprising receiving the operators of the text expression.

16. The method of claim 13, wherein the associated concept identifiers comprise one or more of numeric identifiers, alphanumeric identifiers, random numbers, acronyms, words, or letters.

17. The method of claim 13, further comprising constructing a concept identifier from a first letter of each word comprising the associated concept or sub-concept.

18. The method of claim 13, further comprising constructing a unique concept identifier from a word comprising a sub-concept.

19. The method of claim 13, wherein the text expression comprises lexical words, grammatical words, and punctuation, and the method further comprises generating a sub-concept to represent each of the lexical words, grammatical words, and punctuation, based on the precedence defined by the operators.

20. The method of claim 7, further comprising forming higher order sub-concepts by joining first order sub-concepts represented by the lexical words, grammatical words, and punctuation, based on the precedence defined by the operators.

21. A system for knowledge representation in a computer that can enable natural language communication with a computer, the system comprising:
 a user interface configured to receive an input text string via a text input field, the text string comprising registered and unregistered concepts;
 a database configured to store at least one table, the at least one table configured to store associations between registered concepts and associated concept identifiers; and
 a parser interfaced with the database and the user interface, the parser configured to identify a registered concept represented by the text string and to perform an action in response to the recognized, registered concept, while ignoring unregistered concepts in the text string, using a process comprising:
  breaking the text string into separate elements of language, the elements including lexical words, grammaticals, and punctuation,
  forming an ordered string of sub-concepts corresponding to the elements of language,
  identifying higher order sub-concepts comprising two or more component sub-concepts by searching the at least one table for legal-joins between the component sub-concepts and forming the higher order sub-concepts by joining the component sub-concepts as specified by the at least one table, until a registered concept in the text string is identified and formed, and
  identifying an action associated with the identified, registered concept.

22. The system of claim 21, wherein the action associated with the identified, registered concept comprises at least one of executing a hyperlink, placing a phone call, running a program, answering a question, or other action regularly available in the repertoire of a computer or smart phone.

23. The system of claim 21, further comprising a short tag generator configured to generate a short tag and associate the short tag with the input text string, and wherein the parser is configured to identify the registered concept based on the short tag.

24. The system of claim 23, wherein the short tags are associated with specific computers allowing the same short tag to be used by many users for varying functions.

25. The system of claim 21, wherein the text input field is associated with a search engine.

26. The system of claim 21, wherein the text input field is associated with a smart phone.

27. A system for knowledge representation in a computer that enables natural language communication with a computer, the system comprising:
 a user interface configured to receive an input text document;
 a database configured to store at least one table, the at least one table configured to store associations between one or more forms of registered concepts in the text document and associated concept identifiers; and
 a parser interfaced with the database and the user interface, the parser configured to identify all instances of a registered concept represented in the input text document using a process comprising:
  breaking the input text document into separate elements of language, the elements including lexical words, grammaticals, and punctuation,
  forming an ordered string of sub-concepts corresponding to each of the elements of language,
  identifying higher order sub-concepts comprising two or more component sub-concepts by searching the at least one table for joins between the component sub-concepts and forming the higher order sub-concepts by joining the component sub-concepts as specified by the at least one table, until one or more instances of the registered concept, in any of its one or more forms, is formed; and,
  for each of the one or more instances of the registered concept which are formed, identifying a location of the instance of the registered concept in the input text document.

28. The system of claim 27, wherein the parser is further configured to record the locations in the text document of the instances of the registered concept so that the text document can be searched rapidly, optionally employing the use of Boolean search methods.

* * * * *